Figure 1:
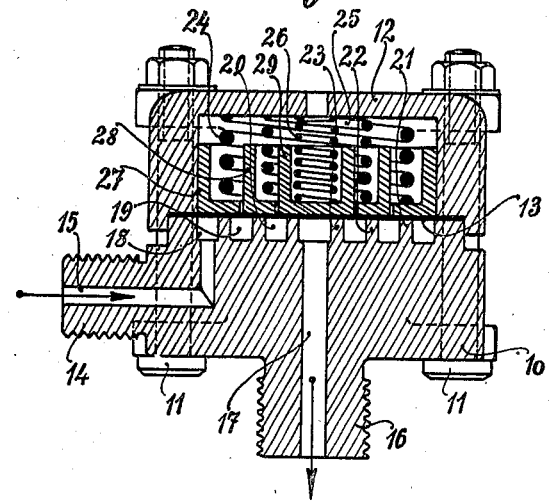

July 13, 1926.

H. ETZELT 1,592,191

MEMBRANE OVERFLOW VALVE

Filed April 14, 1925

Inventor:
H. Etzelt,
By Marko Clerk
Attys.

Patented July 13, 1926.

1,592,191

UNITED STATES PATENT OFFICE.

HEINRICH ETZELT, OF DUSSELDORF, GERMANY, ASSIGNOR TO THE FIRM DE LIMON FLUHME AND COMPANY, OF DUSSELDORF, GERMANY.

MEMBRANE OVERFLOW VALVE.

Application filed April 14, 1925, Serial No. 23,127, and in Germany June 26, 1924.

My invention relates to membrane overflow valves such as are usually inserted between steam cylinders or other machine parts to be lubricated in which a variable pressure prevails, and an oil pump which supplies lubricating oil under pressure to the said parts.

Membrane overflow valves of the kind indicated have the advantage over the non-return or check valves containing a ball or a valve cone wherein the pressure of the oil acts on one side and the steam pressure on the other, that the steam pressure and the oil pressure act jointly on the same side of the shut off member. While in the case of valves of the former kind the admission of oil to the steam cylinder only took place at the time when there was a low steam pressure in the cylinder, the admission of the oil to the steam cylinder in the case of the membrane overflow valves also takes place when the steam pressure is high and even takes place preferably at a high steam pressure.

One object of my invention is to provide a membrane overflow valve of the kind described wherein impurities in the lubricant do not prevent the membrane from closing effectually.

A second object of my invention is to provide a membrane overflow valve wherein the surface upon which the oil pressure acts at the outset is greater than in the case of the known valves of this kind. In the case of the known membrane overflow valves the oil presses at the outset only upon a very small part of the membrane which corresponds to the cross sectional area of the oil duct. This pressure must be sufficient to raise the membrane. After the raising of the membrane the oil pressure extends over the entire surface of the membrane and therefore presses thereon with a pressure which, in comparison with the initial pressure, is increased in the ratio of the area of the membrane to the cross sectional area of the oil pipe. This enlargement of the pressure surface may lead to the overflowing of the membrane and to the breakage thereof. In the case of my improved apparatus, owing to the fact that the oil presses at the outset upon a larger surface of the membrane, overloading of the latter is prevented or at least considerably diminished.

A third object of my invention is to provide a membrane overflow valve wherein a plurality of springs support the membrane in such a manner that they come into action one after another in proportion as the pressure surface of the oil on the membrane increases and that in this manner, to the increase in the oil pressure on the membrane there corresponds an increase in the spring pressure supporting the membrane so that overloading of the membrane is prevented.

In the drawings:—

Figure 2:
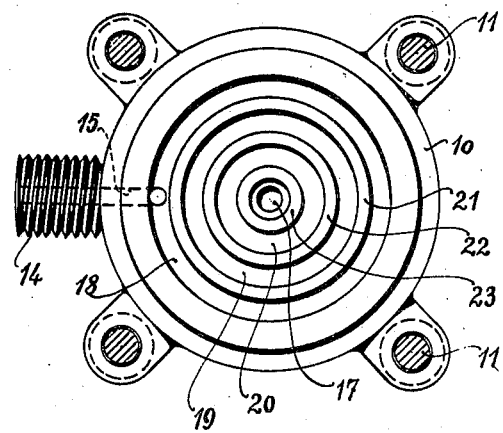

Figure 1 is a sectional elevation through the centre of my membrane overflow valve and Figure 2 is a view from above of the seat of the membrane.

My improved overflow valve consists of a block 10 upon which is secured, by screw bolts 11 or other suitable means, a block 12. Between the two blocks 10 and 12 a membrane 13 is tightly clamped. On the block 10 a screw threaded connection 14 is provided at the side which is connected in a suitable manner with an oil pump which forces the lubricant at a high pressure in the direction of the arrow, into a duct 15 provided in the block 10. On the block 10 is also provided a second screw threaded connection 16 which is connected in a suitable manner with the machine part to be lubricated. Through this connection is bored a duct 17. The oil which enters through the duct 15 raises the membrane 13 and spreads over the entire surface between the block 10 and the membrane 13 and then flows through the duct 17 to the part to be lubricated.

In the upper surface of the block 10 are turned a plurality of concentric grooves, for example three grooves 18, 19 and 20, so that between them narrow concentric ridges 21, 22 and 23 are left standing, upon which the membrane 13 bears and with which it forms a closure against the reflux of the lubricant.

If the lubricant contains impurities, these can only settle with difficulty on the narrow ridges 21, 22, and 23 and prevent the membrane from bearing thereon in a fluid-tight manner. If, however, impurities do temporarily settle on one or other of the ridges, these are washed into the next one of the channels 18, 19 and 20 during the next stroke of the pump and are thus gradually removed. Even if the membrane is temporarily prevented, by such contaminations settling on one or other of the ridges, from bearing in a fluid tight manner upon the said ridge it still makes an effective closure on the other ridges in consequence of its elasticity.

The oil that enters through the duct 15 immediately extends all round the groove 18 and therefore presses against the membrane over the entire cross sectional area of the said groove. The membrane can therefore be very readily raised by the oil.

For the purpose of supporting the membrane springs 24, 25 and 26 are provided, the number of which preferably corresponds to the number of the grooves 18, 19 and 20. These springs are located in a cavity bored out of the block 12 and bear at one end against its upper wall and at the other end against concentric sleeves 27, 28 and 29 respectively which bear upon the membrane 13. Preferably each of the annular concentric ribs 21, 22 and 23 lies opposite to one of the concentric spring sleeves 27, 28 and 29.

The oil first enters the annular groove 18. The spring 24 is so dimensioned that when the oil pressure in the groove 18 is normal it is raised thereby. Since the membrane is resilient the springs 25 and 26 do not yet become operative. After the spring 24 is lifted the oil can flow over into the groove 19. The spring 25 located opposite to the latter is so dimensioned that it is raised by the oil pressure in the groove 19. This oil pressure is the same as the oil pressure in the groove 18, but since the cross sectional area of the groove 19 is smaller than that of the groove 18 the spring 25 must be correspondingly weaker than the spring 24. After the spring 25 is raised the oil enters the groove 20. The spring 26 which in its turn is weaker than the spring 25 to correspond to the smaller area of the groove 20, is now also lifted and the oil then flows into the passage 17.

I do not limit myself to the details as indicated in the specification and drawing. The number of grooves or springs may be more or less. It is also not necessary that the springs and spring sleeves be arranged concentrically and be equal in number with the grooves.

What I claim is:—

1. A membrane overflow valve, comprising in combination a lower member, an upper member, a membrane clamped between said members, and a resilient device adapted to press on said membrane, the lower member being formed with an admission duct and a discharge duct, and the upper surface of the lower member being formed with a plurality of concentric grooves between a plurality of concentric ridges which are adapted to bear against the membrane, one of the ducts communicating with the outermost of said grooves and the other with the central space within the innermost ridges.

2. A membrane overflow valve, comprising in combination a lower member, an upper member, means for connecting the lower member with the upper member, a membrane between the upper member and the lower member, said lower member being formed with ducts and having concentric channels in its upper surface and concentric ridges between said channels, and the valve further comprising a plurality of resilient devices between the upper member and the membrane, adapted to press the membrane against said ridges.

3. A membrane overflow valve comprising in combination a lower member, an upper member, means for connecting the lower member with the upper member, a membrane between the upper member and the lower member, said lower member being formed with ducts, and having concentric channels in its upper surface and concentric ridges between said channels, and a plurality of concentrically arranged resilient devices between the upper member and the membrane adapted to press the membrane against said ridges.

4. A membrane overflow valve, comprising in combination a lower member, an upper member, means for connecting the lower member with the upper member, a membrane between the upper member and the lower member, the lower member being formed with ducts, and having concentric channels in its upper surface and concentric ridges between said channels, and a plurality of concentrically arranged springs of different strengths adapted to press the membrane against the ridges, and concentrically arranged sleeves between said springs and the membrane.

5. A membrane overflow valve, comprising in combination a lower member, an upper member, means for connecting the lower member with the upper member, a membrane between the upper member and the lower member, said lower member being formed with ducts and having concentric channels in its upper surface and concentric ridges between said channels, and the valve further comprising a plurality of resilient devices of different strengths between the upper member and the membrane, adapted to press the membrane against the different ridges with different pressures.

6. A membrane overflow valve comprising in combination a lower member, an upper member, means for connecting the lower member with the upper member, a membrane between the upper member and the lower member, said lower member being formed with an admission duct and a discharge duct, and the upper surface of the lower member being formed with a plurality of concentric grooves between a plurality of concentric ridges which are adapted to bear against the membrane, one of the ducts communicating with the outermost of said grooves and the other with the central space within the innermost ridge, and the valve further comprising a plurality of resilient devices between the upper member and the membrane, adapted to press the membrane against said ridges.

7. A membrane overflow valve comprising in combination a lower member, an upper member, means for connecting the lower member with the upper member, a membrane between the upper member and the lower member, said lower member being formed with ducts, and having concentric channels in its upper surface and concentric ridges between said channels, and a plurality of concentrically arranged co-axial coil springs between the upper member and the membrane adapted to press the membrane against said ridges.

8. A membrane overflow valve comprising in combination a lower member, an upper member, means for connecting the lower member with the upper member, a membrane between the upper member and the lower member, said lower member being formed with ducts, and having concentric channels in its upper surface and concentric ridges between said channels, and a plurality of concentrically arranged co-axial coil springs between the upper member and the membrane adapted to press the membrane against said ridges, the several springs being substantially equal in diameter to the several ridges and arranged co-axially therewith.

In testimony whereof I have signed my name to this specification.

HEINRICH ETZELT.